(No Model.)

W. C. JOHNSON.
PROCESS OF AND APPARATUS FOR TREATING COTTON SEED AND HULLS.

No. 530,533. Patented Dec. 11, 1894.

WITNESSES:

INVENTOR
W. C. Johnson
by Wm B Matthews
ATTORNEY.

UNITED STATES PATENT OFFICE.

WILLIAM CUMMING JOHNSON, OF MEMPHIS, TENNESSEE, ASSIGNOR OF ONE-HALF TO HUGH S. HAYLEY AND DWIGHT M. ARMSTRONG, OF SAME PLACE.

PROCESS OF AND APPARATUS FOR TREATING COTTON SEED AND HULLS.

SPECIFICATION forming part of Letters Patent No. 530,533, dated December 11, 1894.

Application filed March 27, 1894. Serial No. 505,269. (No model.)

*To all whom it may concern:*

Be it known that I, WILLIAM CUMMING JOHNSON, a citizen of the United States, residing at Memphis, in the county of Shelby and State of Tennessee, have invented certain new and useful Improvements in Processes of and Apparatus for Treating Cotton Seed and Hulls; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a process and apparatus for treating cotton seeds and hulls, by means of which the fiber is entirely separated from the seed and collected by itself to form a uniform batting, wadding, or paper stock, while the hull and kernels are crushed and mixed into an elegant food stock or fertilizer free from fiber. Heretofore, efforts have been made in this direction, but it has been found impossible to separate the hulls and kernels and fiber after they have become commingled in their passage from the breaker through a chute. Hence a good quality of food stock could not be obtained; and, as the fiber was cut so very often, a uniform grade of fiber could not be obtained, and all use of it as a paper stock had to be abandoned. My invention cures these defects, and produces an absolutely fiberless food stock or fertilizer and a perfectly uniform quality of long fiber suitable for paper stock.

With these objects in view, my invention consists in breaking the hulls by attrition and concussion, and then conducting the broken mass forcibly and rapidly into a separator which thoroughly separates the fiber from the hull and kernel.

My invention consists also in certain steps hereinafter detailed, and it consists also in certain constructions and combinations more fully described hereinafter and pointed out in the claims.

Figure 1:
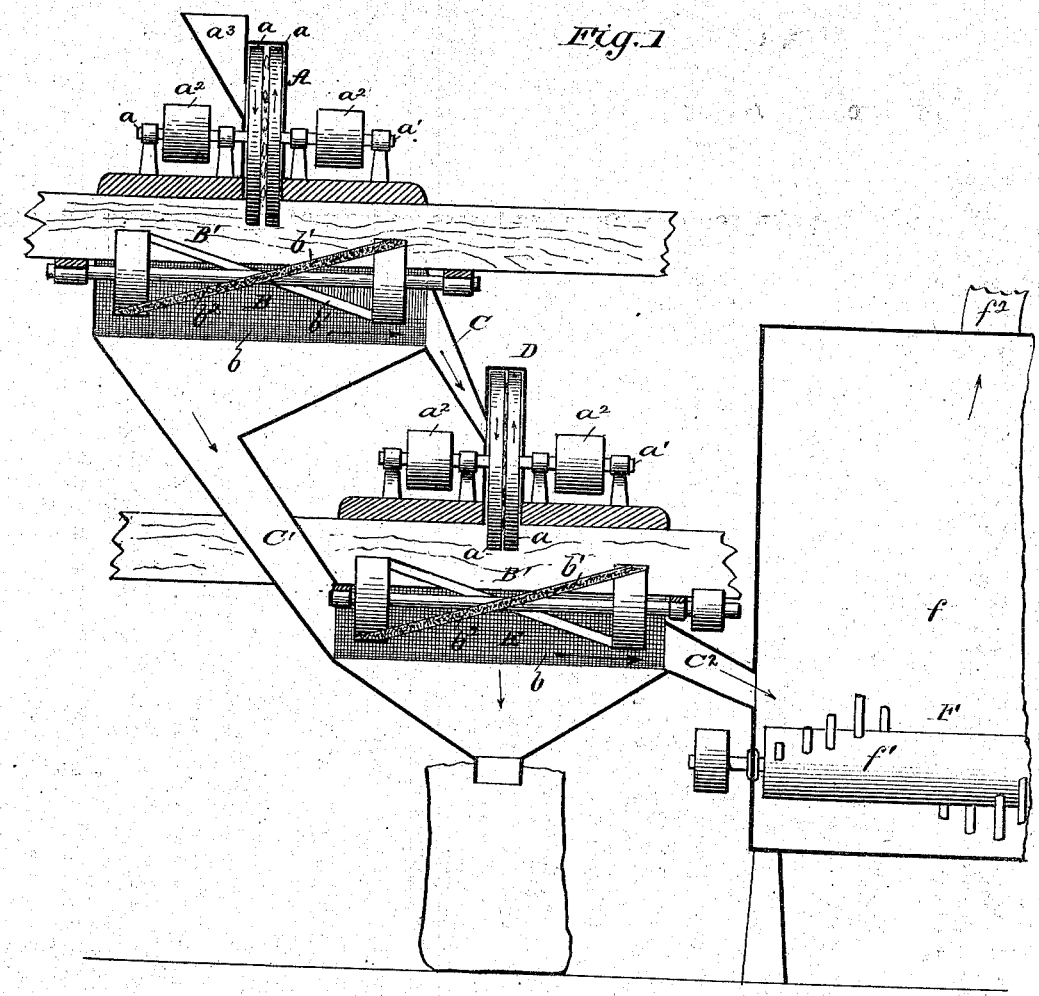
Figure 2:
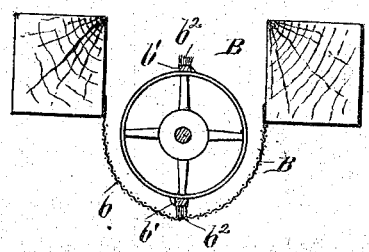

In the drawings forming a part of this specification, Figure 1 is a longitudinal elevation partly in section, showing the improved apparatus for carrying out my improved process. Fig. 2 is a detail cross sectional view of one of the separators.

In carrying out my invention, I employ a rotary breaker or grinder A, consisting of the disks $a$ arranged vertically in close proximity and revolved rapidly in opposite directions by means of the shafts $a'$ $a'$ carrying the pulley wheels $a^2$ $a^2$. The seeds and hulls with the adhering fiber are fed to the breaker or grinder by means of a hopper $a^3$. The disks are so constructed and arranged that the hulls and kernels are broken or split without cutting the fiber, and the revolutions of the two disks are such that the broken mass is forcibly ejected into a separator B located directly beneath the breaker or grinder. This separator B consists essentially of a U-shaped trough $b$, formed of some strong bolting or screening material, such as wire gauze, the mesh thereof being very fine. A rotary brush B' is journaled within the said trough, said brush consisting of a series of oblique arms $b'$, carrying brushes $b^2$ which contact with the face of the wire gauze or screen. As the broken hulls and kernels and fiber are received into the separator, the rapidly revolving brush forces them into contact with the wire gauze and carrying them around separates the fiber from the hull and forces said hulls and kernels through the mesh; and the fiber being restrained from passing through, is fed out at the end of the separator into a chute C, by means of which it is led to a second breaker or grinder D, similar to the breaker A except that the disks are arranged somewhat closer than in the first instance. The object of this second breaker is to break or grind any particles too large to be forced through the separator B, and also to accomplish a further separation between the hulls and fiber. The hulls, &c., after passing through the second breaker D, are received into a second separator E, which is also similar to the one before described. The separated hulls, &c., which were forced through the first separator are received into a chute C', and by that means conducted to the second separator, where they are given another treatment, so that every particle of fiber may be separated and a uniform grade of food stock produced. The finished product is then conducted to a bag or other suitable receptacle by means of a chute $C^2$. The fiber has, by these various operations, been thoroughly separated from the hulls and kernels, and the operations have been such that the fiber has not been cut or injured, so that a uniform quality of long stock is obtainable which can be used in the manufacture of paper, if so desired. The batting or wadding thus produced can be conducted directly from the second separator; but if a particularly fine quality of stock is desired, we lead it into a beater F, consisting of a chamber $f$ and a rotary beater $f'$, the revolutions of which are so rapid that the fiber is thrown upward toward a passage $f^2$ and all dirt and impurities will fall of their own weight to the bottom of the beater. Connected with the passage $f^2$ is a conductor which leads to the collecting room.

It will thus be seen that I have overcome all the objections hereinbefore mentioned, and by a very cheap and simple process produce a uniform food stock or fertilizer free from fiber, and also a quality of cotton stock of uniform length suitable for paper manufacture.

Having thus described my invention, what I claim is—

1. The process herein described, which consists in first breaking the hulls and seeds by attrition or concussion and forcibly ejecting the mass into a separator, conducting the fiber to a second breaker and subjecting the same to a finer and closer grinding operation and then forcibly ejecting the ground mass into a second separator, the bolted mass from the first separator being led also to this second separator and finally conducting the separated fiber away from the second separator, substantially shown and described.

2. In an apparatus of the class described, the combination with the vertical rotary disks, $a$ $a$, of the horizontal separator, B, arranged beneath the same, the chute C leading from the end of separator, the chute, C', leading from the bottom of separator, the second breaker, D, the disks of which are arranged closer together than the disk $a$ of the first breaker, the horizontal separator B' and the chutes for conducting the fiber and bolted material, substantially as shown and described.

3. In an apparatus of the class described, the combination with a breaker, consisting of the oppositely revolving disks, of a separator comprising a screen and brush, the chutes leading therefrom, a second breaker having its disks closer to each other than the first breaker, a second separator and a beater, all arranged and connected substantially as shown and described.

In testimony whereof I affix my signature in presence of two witnesses.

WILLIAM CUMMING JOHNSON.

Witnesses:
   HIRAM CAMPBELL WARINNER,
   WM. S. ROSEBROUGH.

DISCLAIMER.

530,533.— *William Cumming Johnson*, Memphis, Tenn. PROCESS OF AND APPARATUS FOR TREATING COTTON SEED AND HULLS. Patent dated December 11, 1904. Disclaimer filed May 26, 1906, by the inventor and assignees.

Enter their disclaimer—

"To that part of the claim in said specification which is in the following words, to wit:

"2. In an apparatus of the class described, the combination with the vertical rotary disks, $a\ a$, of the horizontal separator, B, arranged beneath the same, the chute, C, leading from the end of separator, the chute, C', leading from the bottom of separator, the second breaker, D, the disks of which are arranged closer together than the disk $a$ of the first breaker, the horizontal separator, B', and the chutes for conducting the fiber and bolted material, substantially as shown and described."—[*Official Gazette, June 5, 1906.*]